United States Patent [19]
Kobayashi

[11] Patent Number: 4,579,432
[45] Date of Patent: Apr. 1, 1986

[54] AUTOMATIC FILM REWINDING DEVICE

[75] Inventor: Takeo Kobayashi, Tokyo, Japan

[73] Assignee: Asahi Kogaku Kogyo Kabushiki Kaisha, Tokyo, Japan

[21] Appl. No.: 675,763

[22] Filed: Nov. 28, 1984

[30] Foreign Application Priority Data

Nov. 29, 1983 [JP] Japan ................... 58-223076

[51] Int. Cl.⁴ .................. G03B 7/24; G03B 17/36
[52] U.S. Cl. .................... 354/21; 354/214; 354/217
[58] Field of Search ............. 354/21, 289.1, 217, 354/218, 286, 214; 352/78 C

[56] References Cited

U.S. PATENT DOCUMENTS

| | | | |
|---|---|---|---|
| 4,299,466 | 11/1981 | Harvey | 354/217 |
| 4,461,560 | 7/1984 | Yoshino et al. | 354/217 |
| 4,482,226 | 11/1984 | Tamamura | 354/214 |

*Primary Examiner*—Russell E. Adams
*Attorney, Agent, or Firm*—Finnegan, Henderson, Farabow, Garrett & Dunner

[57] ABSTRACT

An automatic film rewinding device in which erroneous rewinding is positively prevented. The film cartridge carries an identifying code indicative of the number of frames of films to be exposed. A number-of-wound-frame dial carries a code dial with which the number of wound frames can be detected. When the detected number of frames contained in a cartridge and the number of wound frames has a predetermined relationship, the motor driving the rewind mechanism is actuated. The motor is stopped when it is detected that the film has been completely rewound into the cartridge.

4 Claims, 2 Drawing Figures

AUTOMATIC FILM REWINDING DEVICE

BACKGROUND OF THE INVENTION

The present invention relates to an automatic film rewinding device for a camera which automatically rewinds the film when the film has been wound a predetermined number of frames.

A variety of automatic film rewinding devices have been proposed and used commercially. One of the essential functions of such a film rewinding device is to detect when the film has been wound. If this detecting operation is inadequate, then the film will be rewound although there remain some frames which are not exposed.

In one example of the conventional automatic film rewinding devices, the fact that all the film has been pulled out of the film cartridge for a predetermined period of time is detected in correlation with the fact that the film feeding sprockets have been stopped for a predetermined period of time, and the film is rewound in response to this detecting operation. In this automatic film rewinding device, because the detecting circuit includes a timer device, the number of components thereof is relatively large and the circuitry is necessarily complex. Moreover, it is necessary to adjust the time measured by the timer device. If the adjustment is performed improperly, the automatic film rewinding may start earlier or later than it should. This problem arises also in a system in which, when the film winding motor is stopped upon completion of the photographing operation, it is detected whether or not the time required for energizing the motor to wind the film exceeds a predetermined value. Additionally, both of these systems suffer from the drawback that, when more than a predetermined number of frames has been exposed, in developing the film, the last frame is liable to be covered by the tape which is bonded to the film to hold the latter to the spool of the film cartridge.

In another system, when film is loaded in the camera, the number of frames of the film is set, and whenever the film is wound, the remaining number of frames is determined so that the film is rewound when the remaining number of frames becomes zero. However, the system is still disadvantageous in that, if the number of frames is erroneously set, or if the setting is changed during the photographing operation, then it is impossible to correctly detect when the film has been wound.

SUMMARY OF THE INVENTION

In view of the foregoing, an object of this invention is to provide an automatic film rewinding device employing a simple device for detecting when the film has been wound to a certain point so that the film can be automatically smoothly rewound and erroneous photographing operations positively prevented.

The foregoing and other objects of the invention are met by an automatic film rewinding device including first through third detecting means. The first detecting means detects the number of frames of a film accommodated in a film cartridge and loaded in a camera, the second detecting means detects the number of wound frames of the film, and the third detecting means detects when the film has been completely rewound. A film rewinding motor is driven when outputs of the first and second detecting means have a predetermined relation, and the film rewinding motor is stopped when the third detecting means provides an output.

DESCRIPTION OF THE PREFERRED EMBODIMENTS

The present invention will be described in detail with reference to preferred embodiments shown in the accompanying drawings.

Figure 1:
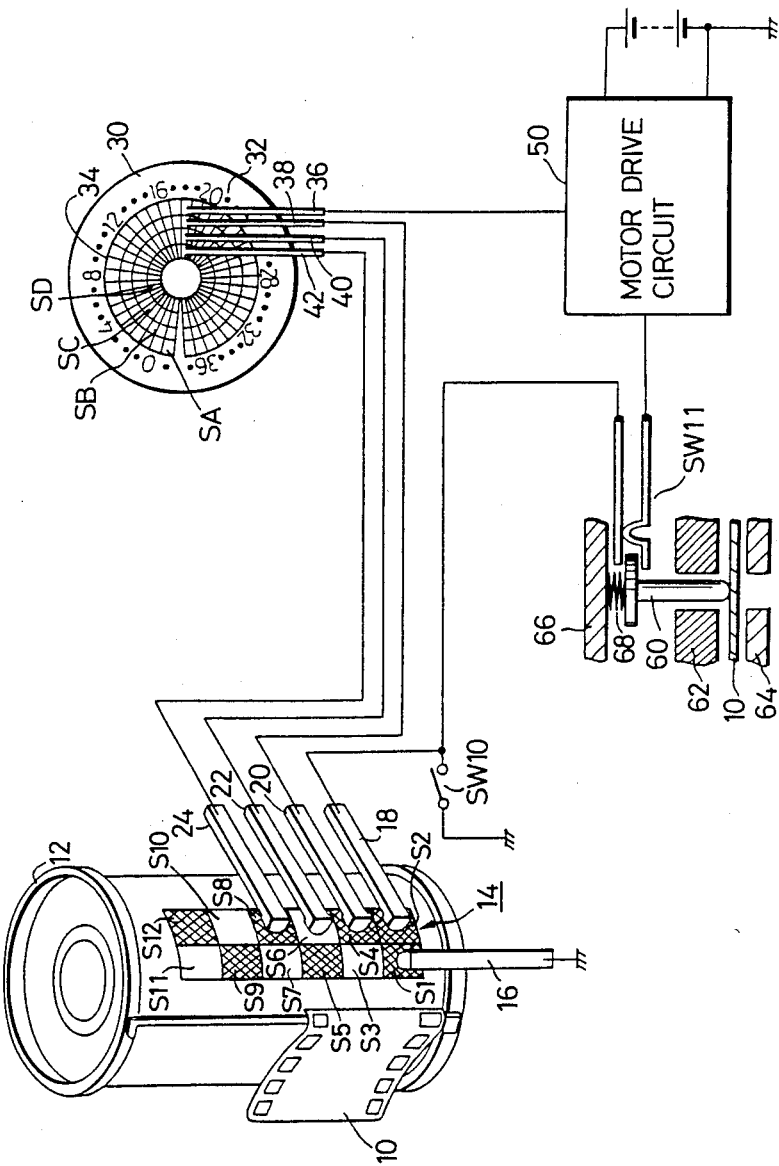
FIG. 1 is an explanatory diagram showing an example of a film rewinding device according to the invention.
Figure 2:
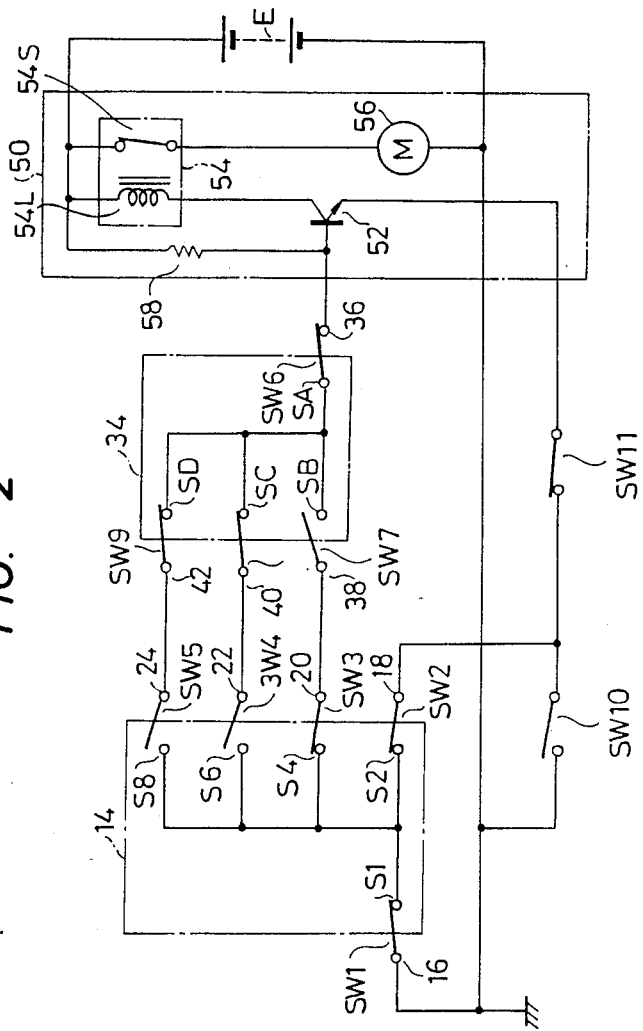
FIG. 2 is an electrical equivalent circuit diagram of the device shown in FIG. 1.

FIG. 1 shows an example of an automatic film rewinding device according to the invention. FIG. 2 shows an equivalent circuit of the device.

As shown in FIG. 1, an electronic reading code 14 is provided on the cylindrical wall of a film cartridge 12 in which a film is accommodated. The electronic reading code 14 is composed of twelve segments S1 through S12. In this example, conductors are bonded to the segments S1, S2, S4, S5, S8, S9 and S12, and the conductors are electrically connected to one another. Insulators are bonded to the remaining segments S3, S6, S7, S10 and S11. In the case where the cylindrical wall of the film cartridge 12 is made of a conductive material, the conductors bonded thereto can be eliminated. Similarly, in the case where the cylindrical wall is made of an insulating material, it is unnecessary to bond the insulators thereto. The conductors may be grounded, in which case a terminal piece (described later) can be eliminated.

The segments S1 and S2 are always conductors. Conductors and/or insulator are selectively bonded to the segments S4, S6 and S8 according to the number of frames of a film 10, for instance, as indicated in the following Table 1:

TABLE 1

| Number of frames | Segments | | |
| --- | --- | --- | --- |
| | S4 | S6 | S8 |
| 12 | Conductor | Insulator | Insulator |
| 20 | Insulator | Conductor | Insulator |
| 24 | Conductor | Conductor | Insulator |
| 36 | Insulator | Insulator | Conductor |
| NA | Conductor | Insulator | Conductor |
| NB | Insulator | Conductor | Conductor |
| 72 | Conductor | Conductor | Conductor |

In the case of FIG. 1, the segments S4 and S8 are conductors and the segments S6 insulators, and therefore the number of frames of the film 10 in the cartridge 12 is NA. In Table 1, NA and NB indicated numbers of frames other than the standard values of 12, 20, 24, 36 and 72 frames.

Terminal pieces 16, 18, 20, 22 and 24 are abutted against the segments S1, S2, S4, S6 and S8, respectively. The terminal piece 16 is grounded so that the conductors of the electronic reading code 14 are grounded. The contact of the terminal piece 16 with the segment S1 is indicated as a switch SW1 in FIG. 2. Similarly, the contact of the terminal piece 18 with the segment S2 is indicated as a switch SW2 in FIG. 2. The ON state of the switch SW2 indicates that the cartridge 12 has been loaded in a camera (not shown). The terminal pieces 20, 22 and 24 and the segments S4, S6 and S8 form switches SW3, SW4 and SW5, respectively. When these switches are turned ON or OFF, the number of frames of a film can be read as indicated in Table 1. For instance, when the switch SW3 is turned ON and the switches SW4 and SW5 are turned OFF, the segment S4 is a conductor and the segments S6 and S8 are insulators, and therefore the number of frames is 12. The relationships between the ON and OFF states of the switches SW3, SW4 and SW5 and the numbers of frames of films are as indicated in the following Table 2:

TABLE 2

| Number of frames | Switch SW3 | Switch SW4 | Switch SW5 |
| --- | --- | --- | --- |
| 12 | ON | OFF | OFF |
| 20 | OFF | ON | OFF |
| 24 | ON | ON | OFF |
| 36 | OFF | OFF | ON |
| NA | ON | OFF | ON |
| NB | OFF | ON | ON |
| 72 | ON | ON | ON |

It goes without saying that if "ON" and "OFF" are replaced respectively by "Condctor" and "Insulator" in Table 2, then Table 1 is obtained.

In the electronic reading code 14, the segments S3, S5, S7, S9 and S11 are provided with insulators when necessary. The conductors of the segments S4, S6, S8, S10 and S12, being electrically connected to the conductor of the segment S1, are grounded.

In FIG. 1, a number-of-frames dial 30 is provided to indicate the number of frames exposed. That is, dial 30 indicates the number of frames before winding and after exposure or the number of frames remaining to be exposed, in other words, the number of frames after winding and before exposure. The dial 30 is arranged so to be observable from outside the camera. Numerals 32 are provided on the surface of the dial 30 so that the user can see the number of frames exposed or remaining.

In addition, a code dial 34 is formed on the dial 30 with which the number of frames wound can be electrically detected. The code dial 34 has concentric arcuate segments SA, SB, SC and SD arranged radially. The arcuate segments SA, SB, SC and SD are divided circumferentially into a number of parts. Among these parts, a part of the segment SB which corresponds to the indicated number of frames "12" on the code dial 34, a part of the segment SC which corresponds to the indicated number of frames "20", parts of the segments SB and SC which correspond to the indicated number of frame "24", and a part of the segment SD which corresponds to the indicated number of frames "36" are covered with insulators, and the remaining parts are covered with conductors which are electrically connected to one another. Terminal pieces 36, 38, 40 and 42 are abutted against the segments SA, SB, SC and SC, thus forming switches SW6, SW7, SW8 and SW9, respectively, as shown in FIG. 2.

The parts of the segments which correspond positionally to the indicated numbers of frames are for instance as shown in FIG. 1. It is to be noted that the positions where the terminal pieces 36, 38, 40 and 42 contact the code dial 34 and the positions were the numbers of wound frames are indicated are determined according to the particular camera. All the parts of the segment SA are covered with a conductor. Therefore, the switch is held turned ON at all times. The ON and OFF states of the switches SW7, SW8 and SW9 are as indicated in the following Table 3. The sum of an indicated number of frames and one is the number of the wound frames which is indicated to the photographer.

TABLE 3

| Indicated number of frames | Switch SW7 | Switch SW8 | Switch SW9 |
| --- | --- | --- | --- |
| −1 to 11 | ON | ON | ON |
| 12 | OFF | ON | ON |
| 13 to 19 | ON | ON | ON |
| 20 | ON | OFF | ON |
| 21 to 23 | ON | ON | ON |
| 24 | OFF | OFF | ON |
| 25 to 35 | ON | ON | ON |
| 36 | ON | ON | OFF |
| 37 to 72 | ON | ON | ON |
| above 73 | OFF | OFF | OFF |

The terminal pieces 38, 40 and 42 are connected to the terminal pieces 20, 22 and 24, respectively. That is, in the equivalent circuit of FIG. 2, the switches SW7, SW8 and SW9 are connected to the switches SW3, SW4 and SW5, respectively. The terminal piece 36 is connected to a motor drive circuit 50. As shown in FIG. 2 the switch SW6 is connected to the base of a transistor 52 in the motor drive circuit 50. The terminal piece 18 (switch SW2) is connected to one contact of a switch SW10, the other contact of which is grounded. The other contact of the switch SW10 is connected through a switch SW11 to the emitter of the transistor 52. The switch SW10 is used in manually rewinding the film. The switch SW11 is turned on when the rear cover of the camera is closed after film has been loaded therein.

The switch SW11 will be described in more detail. The switch SW11 has a pin 60 as shown in FIG. 1. The head of the pin 60 is disposed between extensions of the contacts of the switch SW11 so that the switch SW11 is turned ON and OFF as the pin 60 is moved vertically. The end portion of the pin 60 is located between the camera body 62 and the film pressure plate 64. A spring 68 is provided between the head of the pin 60 and a spring retaining plate 66 so as to urge the pin 60 downwardly in FIG. 1. Accordingly, only when the pin 60 is moved upwardly against the elastic force of the spring 68, namely, when camera's rear cover is closed after film has been loaded, is the switch SW11 turned on.

The motor drive circuit 50 will now be described. The motor drive circuit 50 includes the aforementioned transistor 52, a relay unit 54 including a relay coil 54L and a relay contact 54S, and an electric motor 56. The base of the transistor 52 is connected through a resistor 58 to one terminal of the relay coil 54L, the other terminal of which is connected to the collector of the transistor 52. The one terminal of the relay coil 54L is connected to one terminal of the relay contact 54S, the other terminal of which is grounded through the motor 56. A power source E is connected to the series circuit of the relay contact 54S and the motor 56.

In FIG. 1, the conductors of the electronic reading code 14 are designated by cross-hatched area.

The operations of the above-described embodiment will be described with reference to the case where the number of frames of a film is 12. However, it should be noted that the operation is generally the same for other cases.

In the electronic reading code 14 of the film cartridge 12, the segment S4 is a conductor and the segments S6 and S8 are insulators, as designated in Table 1. When the film cartridge 12 is placed in the camera, the switch SW3 is turned ON and the switches SW4 and SW5 turned OFF. When the film 10 has been threaded and the rear cover of the camera closed, the switch SW11 is turned ON. In this case, the switch SW10 is turned OFF and the switch SW6 turned ON, as described before.

After the photographing operation, the film 10 is wound. When the number of wound frames N is equal to or smaller than 12 (N≦12), that is, when the indicated number of frames M on the number-of-wound-frames dial 30 is equal to or smaller than 11 (M≦11), the switches SW7, SW8 and SW7 are in the ON state as indicated in Table 3. Therefore, the transistor 52 is rendered nonconductive (OFF). As a result, no current flows in the relay coil 54L and the relay contact 54S is not turned ON so that the motor 56 is not energized. Thus, the film 10 is not rewound.

When one frame is additionally wound, then the state of N=13 and M=12 is obtained. In this state, the switch SW7 is turned OFF, as indicated in Table 3, so that the base of the transistor 52 is disconnected from ground. As a result, base current flows through the resistor 58 from the power source E. On the other hand, the emitter of the transistor 52 is grounded through the switches SW11, SW2 and SW1. Accordingly, when the transistor 52 is rendered conductive (ON), the relay coil 54L is energized to close the relay contact 54S. As a result, the motor 56 is energized to rewind the film 10. During this operation, the number-of-rewound-frames code is not changed. The film 10 is quickly rewound into the film cartridge 12.

When the film 10 has been rewound, the pin 60 is moved downwardly by the elastic force of the spring 68 so that the switch SW11 is turned OFF. Accordingly, the application of current to the relay coil 54L is suspended and the relay contact 54L opened so that the motor 56 is deenergized.

The case where the film 10 is manually rewound will be described. In this operation, it is assumed that a film 10 accommodated in a film cartridge 12 having no electronic reading code 14 is employed. In this case, the switches SW1 through SW5 are turned OFF. Accordingly, a bias voltage is applied through the resistor 58 to the base of the transistor 52. The switch SW11 is turned ON when the film 10 is set as described before.

Accordingly, when the user actuates the switch SW10, the emitter of the transistor 52 is grounded so that the relay unit 54 is operated to energize the motor 56, thereby to rewind the film. Upon completion of the rewinding operation, the switch SW11 is turned OFF and the motor 56 deenergized, as described above.

While a preferred embodiment of the invention has been described, it should be clearly understood that the invention is not limited thereto or thereby. Specifically, the described circuit may be replaced by a different circuit performing the same functions. The data of the electronic reading code 14 or the code dial 34 may be stored optically or magnetically, or may be detected by a suitable sensing arrangement.

As is apparent from the above description, in the automatic film rewinding device according to the invention, the number of frames of a film loaded in the camera and the number of frames which has been exposed and rewound are detected and, according to the detection outputs, a motor is driven to rewind the film and, upon detection of the completion of the rewinding operation, the motor is stopped. Accordingly, the device of the invention is advantageous in that it needs no timer circuit for measuring a period of time, with the result that the number of components is reduced, the construction is simplified, and the completion of the film rewinding operation is positively detected and the film automatically smoothly rewound.

I claim:

1. An automatic film winding device comprising:
   first detecting means for detecting a number of frames of a film accommodated in a film cartridge;
   second detecting means for detecting a number of wound frames of said film;
   third detecting means for detecting when said film has been rewound;
   film rewinding means; and
   control means for driving said film rewinding means when detection outputs of said first and second detecting means have a predetermined relation and stopping said film rewinding means when said third detecting means provides an output,
   wherein said second detecting means comprises a number-of-wound-frames dial driven in response to winding of said film, and means for sensing a rotational position of said dial, and
   wherein said means for sensing said rotational position of said dial comprises a code dial having concentric arcuate segments formed of respective conductive and insulating materials arranged in a predetermined pattern indicative of a number of wound frames.

2. The automatic film rewinding device of claim 1, wherein said first detecting means comprises means for detecting a pattern of conductive and insulating segments on an outer surface of said film cartridge.

3. The automatic film rewinding device of claim 1, wherein said third detecting means comprises means for sensing a presence of said film at a position adjacent said film cartridge.

4. The automatic film rewinding device of claim 3, wherein said means for detecting the presence of said film comprises a spring-loaded switch having a pin-like control head disposed so as to sense said presence of said film.

* * * * *